United States Patent
Yu et al.

(10) Patent No.: US 10,789,504 B2
(45) Date of Patent: Sep. 29, 2020

(54) METHOD AND DEVICE FOR EXTRACTING INFORMATION IN HISTOGRAM

(71) Applicant: ABC FINTECH CO., LTD., Beijing (CN)

(72) Inventors: Zhou Yu, Beijing (CN); Yongzhi Yang, Beijing (CN); Song Jin, Beijing (CN)

(73) Assignee: ABC FINTECH CO., LTD., Beijing (CN)

( * ) Notice: Subject to any disclaimer, the term of this patent is extended or adjusted under 35 U.S.C. 154(b) by 234 days.

(21) Appl. No.: 15/955,623

(22) Filed: Apr. 17, 2018

(65) Prior Publication Data
US 2019/0266435 A1  Aug. 29, 2019

(30) Foreign Application Priority Data
Feb. 26, 2018  (CN) .......................... 2018 1 0162747

(51) Int. Cl.
| | |
|---|---|
| G06K 9/00 | (2006.01) |
| G06K 9/46 | (2006.01) |
| G06T 7/13 | (2017.01) |
| G06T 7/70 | (2017.01) |
| G06K 9/40 | (2006.01) |
| G06K 9/62 | (2006.01) |
| G06T 11/20 | (2006.01) |

(52) U.S. Cl.
CPC ......... *G06K 9/469* (2013.01); *G06K 9/00456* (2013.01); *G06K 9/00469* (2013.01); *G06K 9/40* (2013.01); *G06K 9/6256* (2013.01); *G06K 9/6277* (2013.01); *G06T 7/13* (2017.01); *G06T 7/70* (2017.01); *G06T 11/206* (2013.01); *G06K 2209/01* (2013.01); *G06T 2207/20081* (2013.01); *G06T 2207/20084* (2013.01)

(58) Field of Classification Search
CPC .. G06K 2209/01; G06K 9/00; G06K 9/00456; G06K 9/469; G06K 9/6256; G06K 9/6267; G06T 11/206; G06T 2207/20072; G06T 7/62; G06T 7/90
See application file for complete search history.

(56) References Cited

U.S. PATENT DOCUMENTS

| | | | |
|---|---|---|---|
| 2013/0124478 A1* | 5/2013 | Ginzburg | G06Q 10/063 707/639 |
| 2018/0096457 A1* | 4/2018 | Savvides | G06K 9/6267 |
| 2018/0336405 A1* | 11/2018 | Messina | G06K 9/342 |

* cited by examiner

*Primary Examiner* — Tom Y Lu
(74) *Attorney, Agent, or Firm* — Morgan, Lewis & Bockius LLP

(57) ABSTRACT

The present application relates to a method and device for extracting information from a histogram for display on an electronic device. The method comprises the following steps: inputting, into the electronic device, a document, which includes a histogram to be processed; detecting each element in the histogram to be processed by using a target detection method based on a Faster R-CNN model pre-stored in the electronic device; performing text recognition on each detected text element box by the electronic device; to extract corresponding text information; and converting all the detected elements and text information into structured data for display on the electronic device. The method and the device can detect all the elements in the histogram through deep learning and the use of the Faster R-CNN model for target detection, thus providing a simple and effective solution for information extraction in the histogram.

18 Claims, 6 Drawing Sheets

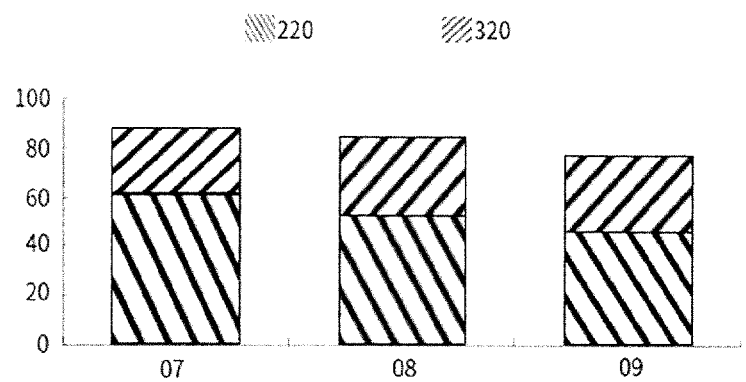
Fig. 6
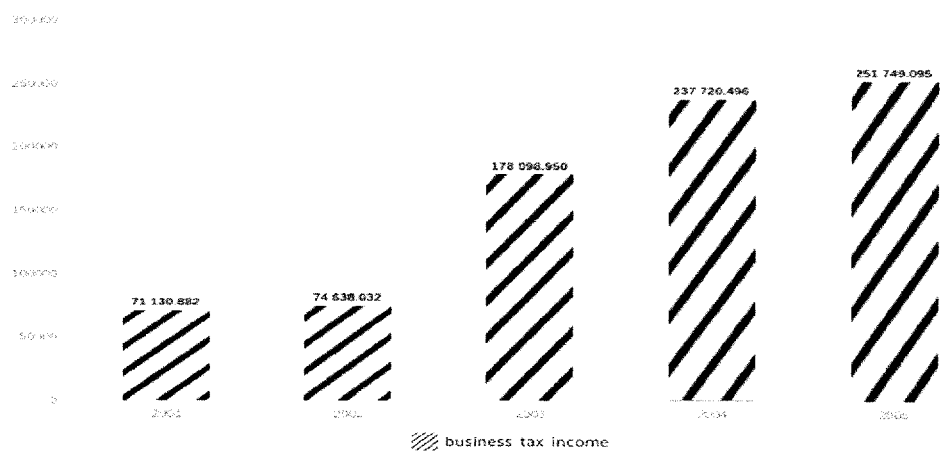
Fig. 7
*// Legend3*
Fig. 8a

METHOD AND DEVICE FOR EXTRACTING INFORMATION IN HISTOGRAM

CROSS-REFERENCE TO RELATED APPLICATION

This application claims the benefit of Chinese Patent Application No. 201810162747.5, filed Feb. 26, 2018 with State Intellectual Property Office, the People's Republic of China, the entire content of which is incorporated by reference herein.

TECHNICAL FIELD

The present application relates to the technical field of data processing, and particularly, relates to a method and device for extracting information in a histogram and converting the information into structured data for display of the histogram on an electronic device.

BACKGROUND

The histogram is a type of chart, and is mainly composed of columns, texts, legends and coordinate axes. In image processing, the columnar patterns in an image are often positioned by using rectangle detection. The traditional rectangle detection method is to extract the contours of patterns of different shapes in the image and select the contours that conform to the rectangle features. Before the contours are extracted, the patterns in the image are usually segmented first. A rectangular pattern generally meets certain aspect ratio, duty cycle and area, and has four corners and four straight edges. The extracted contours are judged according to said features to realize the rectangle detection. In the histogram, there is a lot of interference to the judgment on rectangles, for example, the columns are often connected with a coordinate axis, texts may also be embedded, etc., which are difficult for the detection of rectangle shapes. To accurately extract the rectangles, it is necessary to filter the texts around the columns and abscissas, which is usually relatively complicated. Moreover, the histogram is diverse in form, and the designed interference removing algorithm is difficult to adapt to all images.

SUMMARY

The present application is aimed at providing a method and device for extracting information from a histogram, which can overcome the defect in the prior art that the information extraction of columns and the like in the histogram is difficult.

In order to fulfill the above, the embodiments of the present application provide the following technical solutions:

In one aspect, an embodiment of the present application provides a method for extracting information from a histogram for display on an electronic device, including the following steps:

Inputting, by the electronic device, a document which includes a histogram to be processed;

Detecting, by the electronic device, each element in the histogram to be processed by adopting a target detection method based on a Faster R-CNN model pre-stored in the electronic device;

Performing, by the electronic device, text recognition on each detected text element box to extract corresponding text information;

converting all the detected elements and the text information into structured data for display on the electronic device.

The Faster R-CNN model is obtained through the following training method:

step 1, randomly initializing learning parameters in the Faster R-CNN model;

step 2, inputting a batch of training samples to the Faster R-CNN model to obtain a predicted classification probability $p_i$ and a predicted bounding box coordinate vector $t_i$ of the $i^{th}$ element box in the training sample under the current model parameters;

step 3, performing loss calculation on the output result in step 2 by adopting the following formula, and solving the average loss $L$ of all the element boxes in the training samples $$L(\{p_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*),$$

in which $L(\{p_i\}, \{t_i\})$ is the loss of the $i^{th}$ element box, $N_{cls}$ is the value of mini-batch, $N_{reg}$ is the number of anchor positions, $\lambda$ is weight, $$\sum_i L_{cls}(p_i, p_i^*)$$

is the logarithmic loss of a target and a non-target, and $$\sum_i p_i^* L_{reg}(t_i, t_i^*)$$

is a regression loss function;

step 4, solving the minimized $L$, and updating all the learning parameters in the Faster R-CNN model; and step 5, repeatedly executing steps 2 to 4, till reaching a preset number of iterations.

In another aspect, an embodiment of the present application provides a device for extracting information from a histogram for display on an electronic device, including:

an input module, configured to input a document which includes a histogram to be processed;

an element detection module, configured to detect each element in the histogram to be processed by adopting a target detection method based on a Faster R-CNN model;

a text recognition module, configured to perform text recognition on each detected text element box to extract corresponding text information; and a structured module, configured to convert all the detected elements and the text information into structured data for display on the electronic device.

In another aspect, an embodiment of the present application provides a computer readable storage medium including computer readable instructions, wherein a processor executes the operations in the method of the embodiment of the present application when the computer readable instructions are executed.

In another aspect, an embodiment of the present application simultaneously provides an electronic equipment, including: a memory, configured to store program instructions; and a processor, connected with the memory, and configured to execute the program instructions in the memory to implement the steps of the method in the embodiment of the present application.

Compared with the prior art, the present application has the advantages: the method and the device can detect all the elements in the histogram through deep learning and the use of the Faster R-CNN model for target detection, and can adapt to histograms of various complexities, thus providing a simple and effective solution for information extraction in the histogram.

BRIEF DESCRIPTION OF THE DRAWINGS

In order to illustrate the technical solutions in the embodiments of the present application more clearly, a brief introduction will be made below to the drawings required in the embodiments. It should be understood that the drawings described below are some embodiments of the present application only and should not be regarded as limiting the scope, and other relevant drawings could be obtained based on the drawings by those of ordinary skill in the art without any creative efforts.

FIG. 6 is another type of histogram according to some embodiments of the present application.

FIG. 7 is a histogram reconstructed by using the information extracted from the histogram shown in FIG. 3.

FIG. 8a and FIG. 8b are schematic diagrams before and after de-noising respectively according to some embodiments of the present application.

FIG. 9 is a functional module diagram of an information extraction device for a histogram according to some embodiments of the present application.

DETAILED DESCRIPTION OF THE EMBODIMENTS

Figure 1:
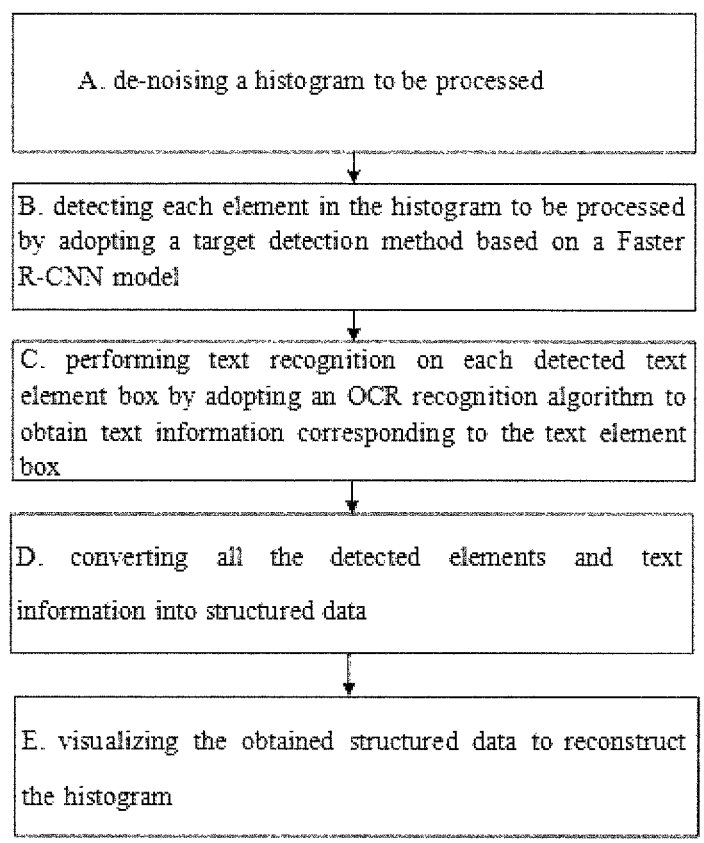
FIG. 1 is a flow diagram of a method for extracting information in a histogram according to some embodiments of the present application.

A clear and complete description will be made to the technical solutions in the embodiments of the present application below in combination with the drawings in the embodiments of the present application. Apparently, the embodiments described are only part of the embodiments of the present application, not all of them. Generally, the components of the embodiments of the present application described and shown in the drawings may be arranged and designed with various different configurations. Therefore, the detailed description of the embodiments of the present application provided in the drawings below is not intended to limit the protection scope of the present application, but only indicates the selected embodiments of the present application. All other embodiments obtained by those skilled in the art without creative efforts based on the embodiments of the present application shall fall within the protection scope of the present application.

Figure 3:
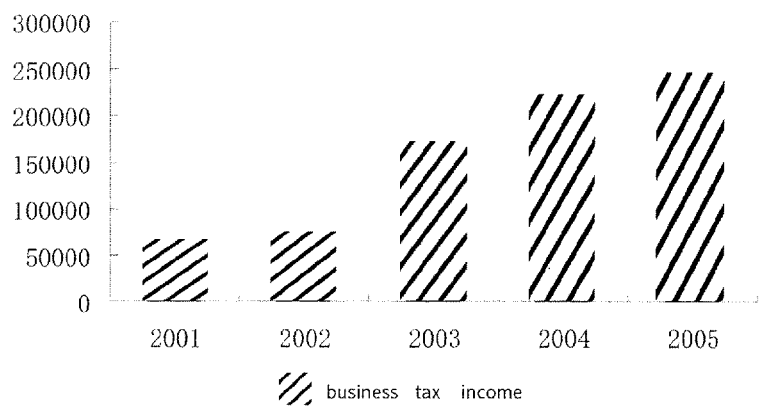
FIG. 3 is an original vertical histogram according to some embodiments of the present application.
Figure 4:
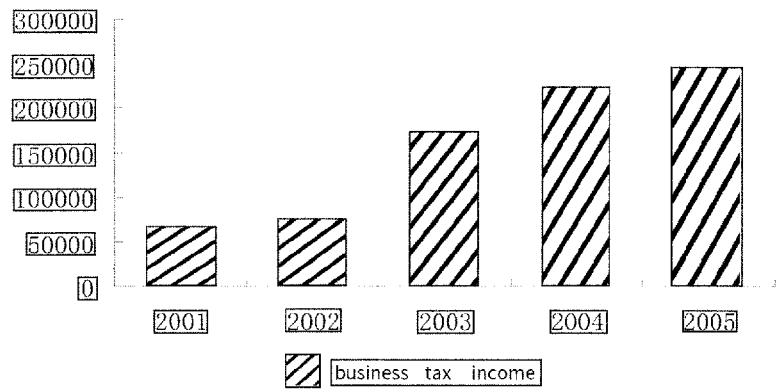
FIG. 4 is a state diagram of FIG. 3 after element detection according to some embodiments of the present application.

Referring to FIG. 1, a method for extracting information in a histogram, provided by this embodiment, includes the following steps:

B. receive a histogram to be processed, and detect each element in the histogram to be processed by using a target detection method based on a Faster R-CNN model, that is, input the histogram to be processed to a pre-trained Faster R-CNN model to output corresponding element types and positions of all the elements in the histogram, wherein the elements include columns, coordinate axes, texts and legends. As shown in FIGS. 3 and 4, FIG. 3 is an original histogram, and FIG. 4 is a state diagram after detection by the Faster R-CNN model. The bounding rectangle of all elements extracted after detection by the Faster R-CNN model may be referred to as an element box.

Figure 2:
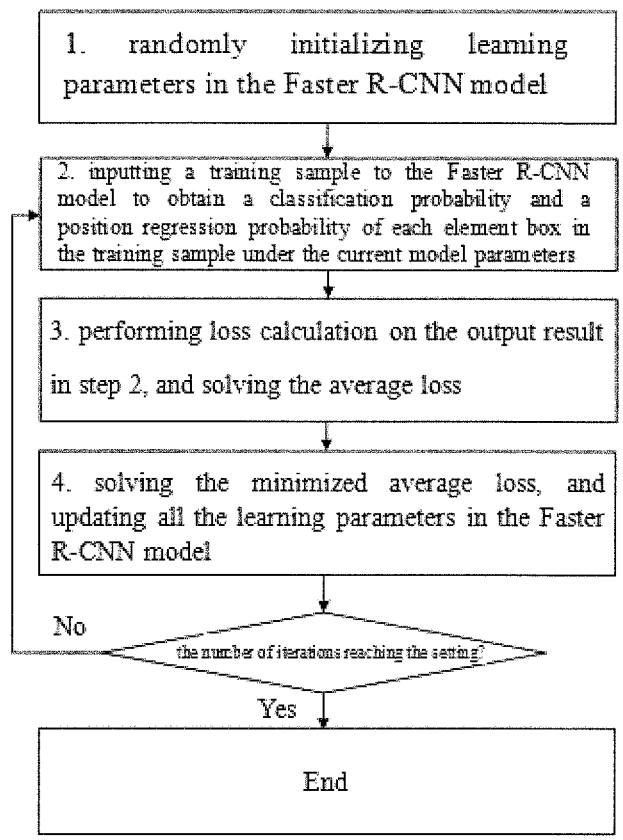
FIG. 2 is a flow diagram of training a Faster R-CNN model according to some embodiments of the present application.

The Faster R-CNN model is mainly used for detecting the targets in natural scenes, such as vehicles, people, animals and the like. However, the inventor found in the studies, when the model is applied to the element detection in the histogram, a good detection effect can be achieved, and the determination on element types and position regression can be very accurate. The samples for training the Faster R-CNN model includes a training set and a test set. The test set is derived from manual marking. Columns, coordinate axes, texts and legends are marked in the image. The coordinate axes can be subdivided into a horizontal coordinate axis and a vertical coordinate axis. Referring to FIG. 2, in this embodiment, the procedure of training the Faster R-CNN model is as follows:

Step 1. randomly initialize learning parameters in the Faster R-CNN model;

Step 2. input a batch (corresponding to the mini-batch to be described later) of training samples to the Faster R-CNN model to obtain a predicted classification probability $p_i$ and a predicted bounding box coordinate vector $t_i$ of the $i^{th}$ element box in the training sample under the current model parameters;

Step 3. perform loss calculation on the output result in step 2 by adopting the following formula, and solve the average loss $\overline{L}$ of all the element boxes in the training samples, $$L(\{p_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*),$$

in which $L(\{p_i\}, \{t_i\})$ is the loss of the $i^{th}$ element box, $N_{cls}$ is the value of mini-batch, generally 256, $N_{reg}$ is the number of anchor positions, generally approximately 2400, $\lambda$ is weight, usually set to 10, then the cls and reg are almost equal weights, $$\sum_i L_{cls}(p_i, p_i^*)$$

is the logarithmic loss of a target (i.e., an element box) and a non-target, $L_{cls}(p_i, p_i^*)=-\log[p_i^* p_i+(1-p_i^*)(1-p_i)]$, the actual label probability Pi* is 1 if Pi is positive, Pi* is 0 if Pi is negative, $$\sum_i p_i^* L_{reg}(t_i, t_i^*)$$

is a regression loss function, $L_{reg}(t_i,t_i^*)=R(t_i-t_i^*)$, wherein R is a defined robust loss function (smooth L1), $$smooth_{L_1}(x) = \begin{cases} 0.5x^2 & \text{if } |x| < 1 \\ |x| - 0.5 & \text{otherwise} \end{cases},$$

ti is a vector indicating 4 parameterized coordinates of the predicted bounding box, and ti* is the coordinate vector of the actual bounding box.

Step 4. solve the minimized $\overline{L}$, and update all the learning parameters in the Faster R-CNN model.

In this step, a BP algorithm may be adopted to solve the minimized $\overline{L}$. The BP algorithm is a standard method for parameter updating in a neural network. When the parameters are updated, a gradient descent method, i.e., a method of finding a weight parameter W corresponding to the optimal solution loss, is adopted. The specific step is as follows: solving a derivative for each parameter W in a loss function, finding a negative gradient direction dW of each parameter, and then performing a small step update, i.e., updating the weight W=W+learning_rate*dW, wherein learning_rate is a learning rate or is understood as an update step length, for example, is set to 0.001. This step is iterated. Because the derivative is solved from a composite function (multilayer neural network), the chain rule in calculus is adopted. The chain rule is embodied as back propagation (BP) in the neural network, and BP is a dedicated term in the neural network. dW is calculated forward in sequence from the last layer.

Step 5, repeatedly execute steps 2 to 4 until reaching a preset number of iterations. The number of iterations may be set empirically, for example, 100,000 times, but the set number of iterations at least needs to guarantee that the minimized L in step 4 no longer changes.

Through deep learning and the use of the Faster R-CNN model for target detection, all the elements in the histogram can be detected, and the method can adapt to histograms of various complexities.

C. perform text recognition on each detected text element box by adopting an OCR recognition algorithm to obtain text information corresponding to the text element box. That is, the text information in each text element box is recognized through an Attention-ocr model, e.g., corresponding data 0, 50000 and the like on the left side of the y axis in FIG. 4, legend character "主营业务收入（万元）" in FIG. 4, etc. The OCR recognition is a mature prior art, and is not further described herein. Understandably, the text information in the text element box may also be recognized in other ways.

D. convert all the detected elements and text information into structured data.

This step may include the following steps in specific implementation:

D1. dividing the columns into groups according to legends;

D2. performing layout analysis to obtain a label of each text; and

D3. performing data mapping and type binding on the columns to obtain final structured data.

In a more specific solution, step D1 of dividing the columns into groups according to the legends specifically may be: calculating a LAB value of each legend and a LAB value of each column in an LAB space; and for each column, performing Euclidean distance calculation on the LAB value of the column and the LAB value of each legend, wherein the legend at the smallest distance from the column is a legend corresponding to the column.

The LAB value is for a single pixel. The Euclidean distance calculation on the LAB value of the column and the LAB value of each legend may be implemented in various modes, for example, as an implementation being high in reliability and simple in operation, an LAB mean of all the elements in the whole column and an LAB mean of all the elements in the legend may be solved first, and then the Euclidean distance calculation is performed by using the two LAB means. If the colors are more similar, the Euclidean distance value is smaller, so the legend nearest the column can be judged as a legend corresponding to the column. For example, in the histogram shown in FIG. 5, all the columns with the deepest color are divided into a group corresponding to the legend of "其他", and all the columns with the lightest color are divided into a group corresponding to the legend of "总面积". For another example, in the stacked histogram shown in FIG. 6, the principle is same. The bottom layer (different columns in the actual histogram are indicated by different colors, but based on the achromatic drawings of the specification, each column is distinguished with a rectangular box to facilitate the expression) of columns is divided into a group corresponding to the legend of "220 以下", and the top layer of columns is divided into a group corresponding to the legend of "320 以上".

As another implementation, Euclidean distance calculation may also be performed on the LAB value of each pixel in the column and the LAB value of each pixel in each legend, and then the Euclidean distance mean of all the pixels in the column is solved. Such implementation also has high enough reliability, but has large calculation quantity and high equipment requirement.

The LAB color space is a CIE-specified international standard for determining colors. This color model differs from other color models in that it is independent of a display device itself and is based on human eye sense (that is, the color difference calculated from LABs of two colors is the same as that subjectively sensed by human eyes). L in the LAB space represents the brightness, A represents the range from red to green, and B is the range from yellow to blue.

The histogram after target detection is in an RGB color space, so the histogram needs to be converted from the RGB color space to the LAB color space. The RGB color space cannot be directly converted into the LAB color space, but depends on an XYZ color space. The RGB color space is converted into the XYZ color space, and then the XYZ color space is converted into the LAB color space. The RGB color space and the XYZ color space, as well as the XYZ color space and the LAB color space, respectively have the following relations, and the histogram can be converted from the RGB color space to the LAB color space according to these relations.

$$\begin{bmatrix} X \\ Y \\ Z \end{bmatrix} = \begin{bmatrix} 0.412453 & 0.357580 & 0.180423 \\ 0.212671 & 0.715160 & 0.072169 \\ 0.019334 & 0.119193 & 0.950227 \end{bmatrix} \begin{bmatrix} R \\ G \\ B \end{bmatrix}$$

$$L^* = 116f/(Y/Y_n) - 16, A^* = 500[f(X/X_n) - f(Y/Y_n)],$$

$$B^* = 200[f(Y/Y_n) - f(Z/Z_n)], f(t) = \begin{cases} t^{1/3} & \text{if } t > \left(\frac{6}{29}\right)^3 \\ \frac{1}{3}\left(\frac{29}{6}\right)^2 t + \frac{4}{29} & \text{otherwise} \end{cases}.$$

There are several types of texts in a histogram, such as a title, units, X-axis texts, Y-axis texts, legend texts, and other descriptive texts. Not all histograms have these types of texts, for example, there may be no titles, units or other descriptive texts. Various texts in the histogram have certain rules, for example, the legend text is on the right of the legend and the right edge of the legend element box is nearest the left edge of the legend text box, the text on the left of the y axis and aligned right is a y-axis text, the text below the x axis and aligned top is an x-axis text, and the text having larger aspect ratio and centered in the upper part of the image is judged as a title text among all the texts except the legend text, the x-axis text and the y-axis text. The text containing a unit keyword and located nearby the y axis is judged as a unit text, and the rest is other descriptive texts. Thus, each text element box is correspondingly labeled according to these rules.

That is, step D2 of performing layout analysis to obtain a label of each text may be implemented as follows: determining the text nearest to the legend as a legend text; determining the texts on the left of the y axis and aligned to the right as y-axis texts, and determining the texts below the x axis and aligned to the top as x-axis texts; determining the text having an aspect ratio greater than a set threshold and centered in the upper part of the image as a title text; determining the texts containing a unit keyword as unit texts, and determining other text (if any) as other descriptive text. By labeling the texts in the above manner, the accuracy of determining the types of the texts can be guaranteed, and the implementation is simple.

Data mapping on the columns refers to matching of the columns and data to find the data expressed by the columns. There are two kinds of coordinate systems in the histogram, one is an image coordinate system taking pixels as units, and the other one is a data coordinate system. The two coordinate systems have a linear relation. Through the above-mentioned element extraction, the position of each element box can be determined. The center point of the element box is taken as an anchor point, the content of the text can be obtained via OCR, and a linear model can be fitted out through the both, such that a corresponding data can be obtained for each position in the column. Thus, as an embodiment, in step D3 above, the data mapping on the columns specifically may be: for each data text element box corresponding to the y axis (for a vertical histogram, the text on the y axis indicates data, and the text on the x axis indicates types of columns) or the x axis (for a horizontal histogram, the text on the x axis indicates data, and the text on the y axis indicates types of columns), calculating the position of each text element box in the image by using the center point of the text element box as an anchor point, and performing linear fitting on the data in the text element box and the position of the text element box in the image to obtain a linear relation; for each column, determining the position thereof in the image according to the upper edge and the lower edge thereof, and determining the data corresponding to the column according to the position of the column in the image and the linear relation to realize data mapping.

Taking the vertical histogram as an example, as shown in FIG. 4 below, the data of each column is mapped from the digit on the y axis. In this figure, the positions of the upper edge and the lower edge of the column in the image are calculated first, e.g., the upper edge is on line 200 and the lower edge is on line 300. Seven text boxes are on the left of the y axis, indicating scales of the y axis. The position of each box in the image is calculated via the anchor point. For example, if '300000' is on line 50, '250000' is on line 100, '200000' is on line 150, '150000' is on line 200, '100000' is on line 250, '50000' is on line 300 and '0' is on line 350, "300000, 250000, 200000, 150000, 100000, 50000 and 0" and "50, 100, 150, 200, 250, 300 and 350" have a linear relation. After the linear relation is fitted, the line numbers of the edges of the column in the image are known, and the corresponding value of the column can be calculated. For example, referring to FIG. 7, the data corresponding to the first column in FIG. 4 is 71130.882, and the data corresponding to the second column is 74638.032.

As an implementable example, the type binding in step D3 above specifically may be: for each type text element box corresponding to the x axis or the y axis, moving the text element box within a certain range by using the center point of the text element box as an anchor point, calculating the distance between the text element box and each group of corresponding columns at each move, and selecting the minimum distance position as the placement position of the text element box to realize column type binding.

Figure 5:
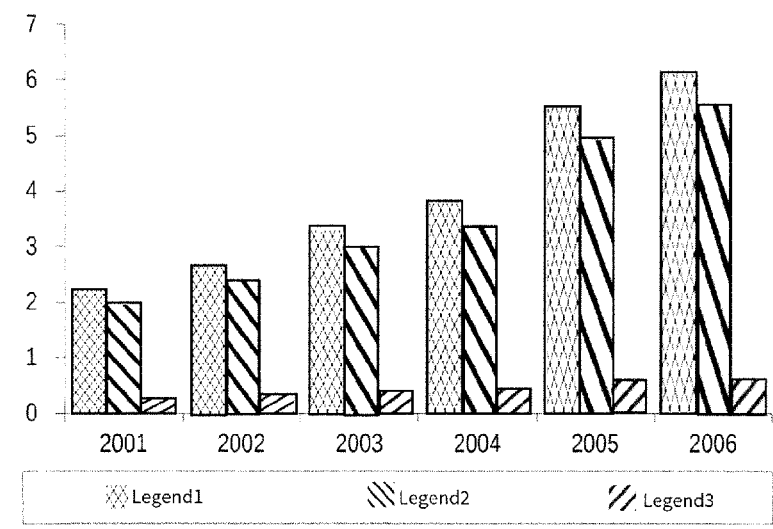
FIG. 5 is another type of histogram according to some embodiments of the present application.

For example, in the histogram shown in FIG. 5, three groups of columns should be matched with the text below the x axis. The x value of the center point of the element box is taken as an anchor point for the column and the text. The text element box below the x axis is moved by using pixels as a unit within a certain range (within a column period range, e.g., a column period range in FIG. 3, including the width of the column and the distance between the adjacent columns; a column period range in FIG. 5, including the total width of three columns and the distance between the adjacent columns), the anchor point distance between the text element box and each column element box is calculated once a pixel is moved, and when the text element box is moved just below the three columns, the position is the best text matching position for the columns. Since each text corresponds to the position just below three columns, the whole text element boxes below the x axis can be moved. The positions of all the text element boxes below the x axis can be determined only by single determination, so the operation is simpler and the binding speed is higher.

All the information in the histogram is obtained via steps B-D above, and the histogram can be reconstructed by visually displaying the structured data. HIGHCHARTS is a convenient and fast HTML5 interactive chart library and it can be easy to add interactive charts to web sites or web applications. For example, the structured data can be visualized with the HIGHCHARTS to obtain a new histogram as shown in FIG. 7. When the HIGHCHARTS is used for drawing, it only needs to input legend colors and a legend text corresponding to each group of columns, mapping data of each group of columns and the y axis, and a text of each group of columns corresponding to the x axis.

Generally, the histogram to be processed is a JPEG format image, which is obtained after JPEG compression, and noise is generated during compression. In order to facilitate element detection and further improve the accuracy of element detection in step B, in another embodiment, before step B, the method further includes step A of de-noising the histogram to be processed, and in this case, the target detection in step B is performed on the de-noised histogram to be processed.

The above de-noising process may be: inputting the histogram to be processed to a pre-trained full convolutional network model to output a de-noised and resolution-improved image.

The full convolutional network model structurally includes an input layer, convolutional layers, an activation layer, residual modules, a BN layer and a sub-pixel layer. The full convolutional network model may be trained via the following steps:

a. randomly initialize parameters of the full convolutional network model.

b. randomly select Batchsize sample pictures, and randomly cut an image of which the size is W*H on each sample picture as a target image sample of current iteration.

c. normalize each pixel in the target image samples to −1 to 1.

d. perform 2-fold resolution reduction of bilinear interpolation on the target image samples, and perform JPEG compression according to a random compression ratio to obtain simulated JPEG compression images having the size of $$\frac{W}{2} * \frac{H}{2}.$$

e. input a batch of JPEG images obtained in step d to the full convolutional network model initialized in step a to obtain output images having the size of W*H.

f. calculate a current mean square error loss for the current iteration:

$$loss = \frac{1}{Batchsize * W * H} \sum_{x=1}^{W} \sum_{y=1}^{H} (target - output)^2,$$

wherein target is a target value of a high-definition PNG image of a sample picture, and output is an output value obtained by inputting the corresponding low-resolution JPEG image to the network model.

The samples learned by training are given in the form of sample pairs. The high-definition PNG image generated by the target may be drawn via vector PDF according to the specified high resolution (e.g., resolution 1600*1200), the resolution is reduced two times while high-resolution lossless images are generated, and corresponding low-resolution JPEG images are generated according to a random JPEG compression rate to form sample pairs for training the model.

g. update the parameters of the current full convolutional network model by using a BP algorithm; and repeatedly execute steps b to g until reaching a preset number of iterations.

Figures 8B, 9:
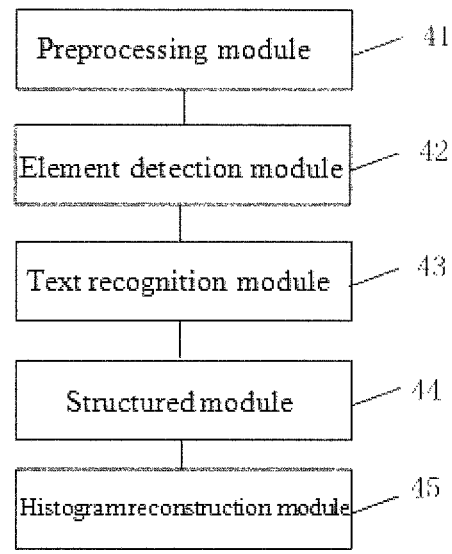

After the JPEG image to be processed is processed with the full convolutional network model trained by the above process, JPEG noise can be removed, the resolution of the image is improved, and an image with higher quality is obtained to facilitate element detection. As shown in FIG. 8a and FIG. 8b, FIG. 8a shows an original image, FIG. 8b shows a de-noised image, and displayed here is only the legend "其他" in FIG. 5.

Based on the same inventive concept as the above method, an embodiment of the present application further provides an information extraction device for a histogram. As shown in FIG. 9, the information extraction device for the histogram includes a preprocessing module 41, an element detection module 42, a text recognition module 43, a structured module 44 and a histogram reconstruction module 45.

The preprocessing module 41 is configured to de-noise a histogram to be processed to obtain a de-noised histogram to be processed for use by the element detection module.

The element detection module 42 is configured to detect each element in the histogram to be processed by adopting a target detection method based on a Faster R-CNN model, wherein the elements include columns, coordinate axes, texts and legends.

The text recognition module 43 is configured to perform text recognition on each detected text element box by adopting an OCR recognition algorithm to obtain text information corresponding to the text element box.

The structured module 44 is configured to convert all the detected elements and text information into structured data.

The structured module 44 includes: a grouping submodule, configured to divide the columns into groups according to legends; a label submodule, configured to perform layout analysis to obtain a label of each text; and a mapping submodule, configured to perform data mapping and type binding on the columns to obtain final structured data.

The grouping submodule is specifically configured to respectively calculate the LAB value of each legend and the LAB value of each column in an LAB space, and for each column, perform Euclidean distance calculation on the LAB value of the column and the LAB value of each legend, wherein the legend at the smallest distance from the column is a legend corresponding to the column.

The label submodule is specifically configured to determine the text nearest the legend as a legend text, determine the texts on the left of the y axis and aligned to the right as y-axis texts, determine the texts below the x axis and aligned to the top as x-axis texts, determine the text having an aspect ratio greater than a set threshold and centered in the upper part of the image as a title text, and determine the texts containing a unit keyword as unit texts.

The mapping submodule is specifically configured to, for each data text element box corresponding to the y axis or the x axis, calculate the position of each text element box in the image by using the center point of the text element box as an anchor point, and perform linear fitting on the data in the text element box and the position of the text element box in the image to obtain a linear relation; for each column, determine the position thereof in the image according to the upper edge and the lower edge thereof, and determine the data corresponding to the column according to the position of the column in the image and the linear relation to realize data mapping; and for each type text element box corresponding to the x axis or the y axis, move the text element box within a certain range by using the center point of the text element box as an anchor point, calculate the distance between the text element box and each group of corresponding columns at each movement, and select the minimum distance position as the placement position of the text element box to realize column type binding.

The histogram reconstruction module 45 is configured to visually display the obtained structured data to reconstruct the histogram.

For the uninvolved part in the embodiment of the information extraction device for a histogram, reference may be made to the corresponding description in the foregoing embodiment of the information extraction method for a histogram.

Figure 10:
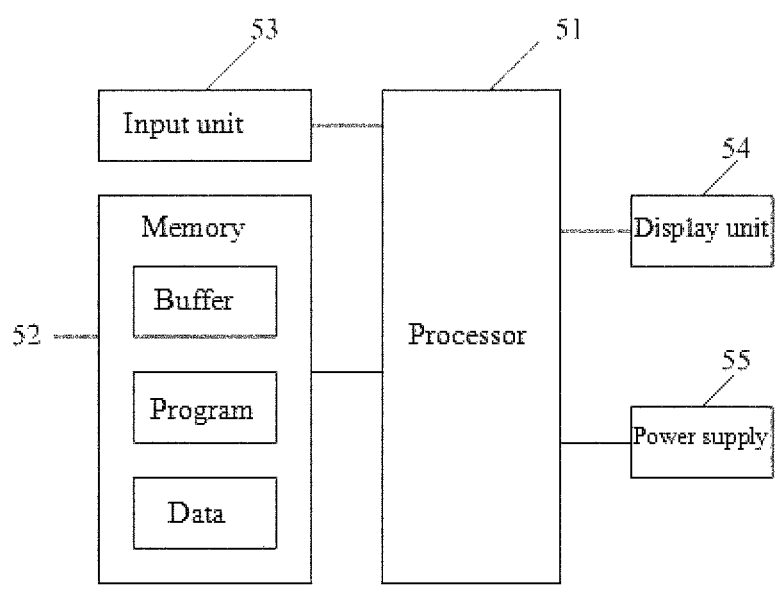
FIG. 10 is a structure block diagram of electronic equipment according to some embodiments of the present application.

As shown in FIG. 10, this embodiment simultaneously provides electronic equipment. The electronic equipment may include a processor 51 and a memory 52, wherein the memory 52 is coupled to the processor 51. It should be noted that the figure is exemplary, and the structure may also be supplemented or replaced by using other structure to realize data extraction, graph redrawing, communication or other functions.

As shown in FIG. 10, the electronic equipment may further include an input unit 53, a display unit 54 and a power supply 55. It is worth noting that the electronic equipment does not necessarily include all components shown in FIG. 10. Moreover, the electronic equipment may further include components not shown in FIG. 10, referring to the prior art.

The processor 51 is also referred to as a controller or an operation control sometimes, and may include a microprocessor or other processor device and/or logic device. The processor 51 receives an input and controls the operation of each component of the electronic equipment.

The memory 52, for example, may be one or more of a cache, a flash memory, a hard driver, a mobile medium, a volatile memory, a non-volatile memory and other proper device, and may store configuration information of the processor 51, instructions executed by the processor 51, recorded graph data and other information. The processor 51 may execute a program stored in the memory 52 to implement information storage or processing or the like. In one embodiment, the memory 52 further includes a buffer memory, i.e., a buffer, to store intermediate information.

The input unit 53, for example, is configured to provide a sample image or a histogram to be processed for the processor 51. The display unit 54 is configured to display a histogram after element detection, or information extracted from the histogram, or a reconstructed histogram. The display unit, for example, may be a liquid crystal display (LCD), but the present application is not limited thereto. The power supply 55 is configured to supply power to the electronic equipment.

An embodiment of the present application further provides a computer readable instruction, wherein when the instruction is executed in the electronic equipment, the program enables the electronic equipment to execute the operation steps included in the method of the present application.

An embodiment of the present application further provides a storage medium storing a computer readable instruction, wherein the computer readable instruction enables the electronic equipment to execute the operation steps included in the method of the present application.

It should be understood that, in various embodiments of the present application, the serial numbers of the above-mentioned steps do not mean the execution sequence. The execution sequence of the steps should be determined based on the functions and inherent logics thereof, but should not constitute any limitation to the implementation process of the embodiment of the present application.

Those of ordinary skill in the art may realize that the units and method steps of each example described in combination with the embodiments disclosed in the present disclosure can be implemented by electronic hardware, computer software or the combination of computer software and the electronic hardware. In order to clearly describe the interchangeability of hardware and software, the composition and steps of each example are described generally above according to the functions. Whether these functions are executed by hardware or software depends on a specific application and design constraint conditions of the technical solution. Professionals can use different methods to implement the described functions for each specific application, but such implementation should not be considered as going beyond the scope of the present application.

Those skilled in the art may clearly understand that, for the purpose of convenience and briefness in description, for the specific working processes of the above-described systems, devices and units, reference could be made to the corresponding processes in the embodiments of the aforementioned methods, and description is not repeated here.

In the several embodiments provided in the present application, it should be understood that the disclosed systems, devices and methods may be realized in other modes. For example, the embodiments of the above-described devices are only exemplary, for example, the division of the units is only a logic function division, other division modes may be adopted in practice, e.g., a plurality of units or components may be combined or integrated in another system, or some characteristics may be omitted or not executed. In addition, the displayed or discussed mutual coupling or direct coupling or communication connection may be indirect coupling or communication connection of devices or units through some interfaces, and may also be in electrical, mechanical or other forms.

The units illustrated as separate components may be or may not be physically separated, and the components displayed as units may be or may not be physical units, that is to say, the components may be positioned at one place or may also be distributed on a plurality of network units. The objectives of the solutions of the embodiments of the present application may be fulfilled by selecting part of or all of the units according to actual needs.

When the integrated unit is realized in the form of a software functional unit and sold or used as an independent product, the integrated unit may be stored in a computer readable storage medium. Based on such an understanding, the technical solution of the present application substantially, or all or part of the present application making contribution to the prior art, or a part of the technical solution may be embodied in the form of a software product, and the computer software product is stored in a storage medium, which includes a plurality of instructions enabling computer equipment (which may be a personal computer, a server, or network equipment or the like) to execute all or part of the steps in the methods of the embodiments of the present application. The aforementioned storage medium includes: various media capable of storing program codes, such as a U disk, a mobile hard disk, a read-only memory (ROM), a random access memory (RAM), a magnetic disk or an optical disk.

The above description is the specific embodiments of the present application only, but the scope of the present application is not limited thereto, any skilled who is familiar with this art could readily think of variations or substitutions within the disclosed technical scope of the present application, and these variations or substitutions shall fall within the scope of the present application. Thus, the scope of the present application shall be subjected to the scope of the claims.

The invention claimed is:

1. A method for extracting information in a histogram performed by an electronic device having a processor and memory for storing instruction to be executed by the processor, the method comprising:
   inputting, by the electronic device, a document that includes a histogram to be processed;
   detecting, by the electronic device, each element in the histogram to be processed by adopting a target detection method based on a Faster R-CNN model pre-stored in the electronic device;

performing, by the electronic device, text recognition on each detected text element box to extract corresponding text information; and converting, by the electronic device, all the detected elements and text information of the histogram into structured data for display on the electronic device;

wherein the Faster R-CNN model is derived via the following training method:

step 1. randomly initializing learning parameters in the Faster R-CNN model;

step 2. inputting a batch of training samples to the Faster R-CNN model to obtain a predicted classification probability $p_i$ and a predicted bounding box coordinate vector $t_i$ of the ith element box in the training samples under the current model parameters;

step 3. performing loss calculation on the output result in step 2 by adopting the following formula, and solving the average loss $\overline{L}$ of all the element boxes in the training samples, $$L(\{p_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*),$$

in which $L(\{p_i\},\{t_i\})$ is the loss of the ith element box, $N_{cls}$ is the value of mini-batch, $N_{reg}$ is the number of anchor positions, $\lambda$ is weight, $$\sum_i L_{cls}(p_i, p_i^*)$$

is the logarithmic loss of a target and a non-target, and $$\sum_i p_i^* L_{reg}(t_i, t_i^*)$$

is a regression loss function;

step 4. solving the minimized $\overline{L}$, and updating all the learning parameters in the Faster R-CNN model; and step 5. repeatedly executing steps 2 to 4 until reaching a preset number of iterations.

2. The method according to claim 1, wherein the elements comprise columns, coordinate axes, texts and legends.

3. The method according to claim 1, wherein the minimized $\overline{L}$ is solved by adopting a BP algorithm in step 4.

4. The method according to claim 1, wherein the text recognition is performed on each detected text element box by adopting an OCR recognition algorithm to obtain the text information corresponding to the text element box.

5. The method according to claim 1, wherein the instruction for converting all the detected elements and text information of the histogram into structured data for display on the electronic device comprises the following instructions:

D1. dividing the columns into groups according to legends;

D2. performing layout analysis by using a layout tool stored in the electronic device to obtain a label of each text; and D3. performing data mapping and type binding on the columns to obtain final structured data, the structured data being used to display the histogram on the electronic device.

6. The method according to claim 5, wherein step D1 of dividing, by the electronic device, the columns into groups according to legends specifically comprises:

the electronic device respectively calculating a LAB value of each legend and a LAB value of each column in an LAB space; and for each column, performing Euclidean distance calculation on the LAB value of the column and the LAB value of each legend, the legend nearest to the column being a legend corresponding to the column.

7. The method according to claim 5, wherein step D2 of performing layout analysis to obtain a label of each text specifically comprises:

determining a text nearest to the legend as a legend text;

determining texts on the left of they axis and aligned to the right as y-axis texts, and determining texts below the x axis and aligned to the top as x-axis texts;

determining a text having an aspect ratio greater than a set threshold and centered in the upper part of the image as a title text; and determining texts containing unit keyword as unit texts.

8. The method according to claim 5, wherein the step of performing the data mapping on the columns in step D3 specifically comprises:

for each data text element box corresponding to the y axis or the x axis, calculating the position of each text element box in the image by using the center point of the text element box as an anchor point, and performing linear fitting on the data in the text element box and the position of the text element box in the image to obtain a linear relation; and for each column, determining its position in the image according to the upper edge and the lower edge of the column, and determining the data corresponding to the column according to the position of the column in the image and the linear relation to realize data mapping.

9. The method according to claim 5, wherein the step of performing the type binding on the columns in step D3 specifically comprises:

for each type text element box corresponding to the x axis or the y axis, moving the text element box within a column period range by using the center point of the text element box as an anchor point, calculating the distance between the text element box and each group of columns at each move, and selecting the minimum distance position as the position to place the text element box to realize the column type binding.

10. The method according to claim 1, further comprising a preprocessing step of de-noising the input histogram to be processed before the element detection on the histogram to be processed.

11. The method according to claim 10, wherein the de-noising further comprises: inputting the histogram to be processed to a pre-trained full convolutional network model and outputting a de-noised and resolution-improved image.

12. The method according to claim 1, further comprising a histogram reconstruction step of visually displaying the obtained structured data to reconstruct the histogram.

13. The method according to claim 12, wherein the structured data is visualized using HIGHCHARTS to reconstruct the histogram.

14. An electronic device for extracting information in a histogram for display, comprising:

a processor;

memory; and a plurality of computer instructions stored in the memory, wherein the computer instructions, when executed by the processor, cause the electronic device to perform operations including:
  inputting, by the electronic device, a document that includes a histogram to be processed;
  detecting, by the electronic device, each element in the histogram to be processed by adopting a target detection method based on a Faster R-CNN model pre-stored in the electronic device;
  performing, by the electronic device, text recognition on each detected text element box to extract corresponding text information; and
  converting, by the electronic device, all the detected elements and text information of the histogram into structured data for display on the electronic device;
wherein the Faster R-CNN model is derived via the following training method:
step 1. randomly initializing learning parameters in the Faster R-CNN model;
step 2. inputting a batch of training samples to the Faster R-CNN model to obtain a predicted classification probability $p_i$ and a predicted bounding box coordinate vector $t_i$ of the ith element box in the training samples under the current model parameters;
step 3. performing loss calculation on the output result in step 2 by adopting the following formula, and solving the average loss $\overline{L}$ of all the element boxes in the training samples, $$L(\{p_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*),$$

in which $L(\{p_i\},\{t_i\})$ is the loss of the ith element box, $N_{cls}$ is the value of mini-batch, $N_{reg}$ is the number of anchor positions, $\lambda$ is weight, $$\sum_i L_{cls}(p_i, p_i^*)$$

is the logarithmic loss of a target and a non-target, and $$\sum_i p_i^* L_{reg}(t_i, t_i^*)$$

is a regression loss function;
step 4. solving the minimized $\overline{L}$, and updating all the learning parameters in the Faster R-CNN model; and
step 5, repeatedly executing steps 2 to 4 until reaching a preset number of iterations.

15. The electronic device according to claim 14, wherein the elements comprise columns, coordinate axes, texts and legends.

16. The electronic device according to claim 14, wherein the text recognition is performed on each detected text element box by adopting an OCR recognition algorithm to obtain the text information corresponding to the text element box.

17. The electronic device according to claim 14, wherein the instruction of converting all the detected elements and text information of the histogram into structured data for display on the electronic device comprises the following steps:
  D1. dividing the columns into groups according to legends;
  D2. performing layout analysis by using a layout tool stored in the electronic device to obtain a label of each text; and
  D3. performing data mapping and type binding on the columns to obtain final structured data, the structured data being used to display the histogram on the electronic device.

18. A non-transitory computer readable storage medium comprising computer readable instructions that, when executed by a processor of an electronic device having a display, cause the electronic device to perform operations including:
  inputting, by the electronic device, a document that includes a histogram to be processed;
  detecting, by the electronic device, each element in the histogram to be processed by adopting a target detection method based on a Faster R-CNN model pre-stored in the electronic device;
  performing, by the electronic device, text recognition on each detected text element box to extract corresponding text information; and
  converting, by the electronic device, all the detected elements and text information of the histogram into structured data for display on the electronic device;
wherein the Faster R-CNN model is derived via the following training method:
step 1. randomly initializing learning parameters in the Faster R-CNN model;
step 2. inputting a batch of training samples to the Faster R-CNN model to obtain a predicted classification probability $p_i$ and a predicted bounding box coordinate vector $t_i$ of the ith element box in the training samples under the current model parameters;
step 3. performing loss calculation on the output result in step 2 by adopting the following formula, and solving the average loss $\overline{L}$ of all the element boxes in the training samples, $$L(\{p_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*),$$

in which $L(\{p_i\},\{t_i\})$ is the loss of the ith element box, $N_{cls}$ is the value of mini-batch, $N_{reg}$ is the number of anchor positions, $\lambda$ is weight, $$\sum_i L_{cls}(p_i, p_i^*)$$

is the logarithmic loss of a target and a non-target, and $$\sum_i p_i^* L_{reg}(t_i, t_i^*)$$

is a regression loss function;
step 4. solving the minimized $\overline{L}$, and updating all the learning parameters in the Faster R-CNN model, and step 5, repeatedly executing steps 2 to 4 until reaching a preset number of iterations.

\* \* \* \* \*